(12) United States Patent
Wright et al.

(10) Patent No.: US 11,431,856 B2
(45) Date of Patent: Aug. 30, 2022

(54) SYSTEM AND METHOD FOR HANDLING VARIATIONS IN A PRINTED MARK

(71) Applicant: Dover Europe Sàrl, Vernier (CH)

(72) Inventors: Christopher John Wright, London (GB); Matthew John Lawrenson, Chesterfield, MO (US)

(73) Assignee: Dover Europe Sàrl

( * ) Notice: Subject to any disclaimer, the term of this patent is extended or adjusted under 35 U.S.C. 154(b) by 0 days.

(21) Appl. No.: 17/312,759

(22) PCT Filed: Dec. 12, 2019

(86) PCT No.: PCT/EP2019/084806
§ 371 (c)(1),
(2) Date: Jun. 10, 2021

(87) PCT Pub. No.: WO2020/120652
PCT Pub. Date: Jun. 18, 2020

(65) Prior Publication Data
US 2022/0053098 A1    Feb. 17, 2022

(30) Foreign Application Priority Data
Dec. 13, 2018    (EP) .................................... 18212147

(51) Int. Cl.
*H04N 1/00* (2006.01)
*G06K 15/02* (2006.01)
(Continued)

(52) U.S. Cl.
CPC ....... *H04N 1/00087* (2013.01); *G06K 15/027* (2013.01); *H04N 1/00015* (2013.01);
(Continued)

(58) Field of Classification Search
CPC .. H04N 1/00002–00092; H04N 1/2307–2392; H04N 1/387–3935;
(Continued)

(56) References Cited

U.S. PATENT DOCUMENTS

| 8,259,350 B2 | 9/2012 | Wu et al. |
|---|---|---|
| 2012/0019852 A1 | 1/2012 | Ito |
| 2015/0375550 A1 | 12/2015 | Mizes et al. |

FOREIGN PATENT DOCUMENTS

WO    2018017036 A1    1/2018

OTHER PUBLICATIONS

International Search Report for PCT/EP2019/084806 dated Feb. 25, 2020; 2 pages.

*Primary Examiner* — Scott A Rogers
(74) *Attorney, Agent, or Firm* — Lerner, David, Littenberg, Krumholz & Mentlik, LLP (57) ABSTRACT

The embodiments herein relate to a method performed by a system (100) for handling variations in a mark (110) printed by a group (105) of industrial printers (101). The system (100) obtains images of the printed mark (110) printed by each of the printers (101) in the group (105). The system (100) creates a composite image from the obtained images. The printed marks (110) appear as a repeating pattern in the composite image. The system (100) compares the printed marks (110) in the composite image to each other or to another mark. The system (100) detects variations with a first resolution in the printed marks (110) in the composite image as a result of the comparison. The system (100) creates an augmented image in which the detected variations are augmented to a second resolution. The first resolution is lower than the second resolution.

17 Claims, 7 Drawing Sheets

(51) Int. Cl.
  *H04N 1/393* (2006.01)
  *H04N 1/60* (2006.01)
(52) U.S. Cl.
  CPC ..... *H04N 1/00034* (2013.01); *H04N 1/00045* (2013.01); *H04N 1/00079* (2013.01); *H04N 1/00442* (2013.01); *H04N 1/00456* (2013.01); *H04N 1/393* (2013.01); *H04N 1/6055* (2013.01)
(58) Field of Classification Search
  CPC ........... H04N 1/00326; H04N 1/00334; H04N 1/0044; H04N 1/00456; H04N 1/00469; H04N 1/40; H04N 1/40006; H04N 1/40068; H04N 1/401; H04N 1/4015; H04N 1/6052; H04N 1/6055; G06K 15/002; G06K 15/007; G06K 15/027; G06T 7/0002–001
  See application file for complete search history.

SYSTEM AND METHOD FOR HANDLING VARIATIONS IN A PRINTED MARK

CROSS-REFERENCE TO RELATED APPLICATIONS

This application is a national phase entry under 35 U.S.C. § 371 of International Application No. PCT/EP2019/084806, filed on Dec. 12, 2019, published in English, which claims priority to European Patent Application No. 18212147.5, filed on Dec. 13, 2018, the disclosures of which are hereby incorporated herein by reference.

TECHNICAL FIELD

Embodiments herein relate generally to a system and a method performed by the system. More particularly the embodiments herein relate to handling variations in a mark printed by a group of industrial printers.

BACKGROUND

Industrial printing and coding is a fundamental element of modern production lines with enormous numbers of products across a wide range of industries requiring marking of some form. This marking may range from a simple best before-label to more complex marks that allow data transmission through scanning processes, such as Quick Response (QR) codes and barcodes. According to GS1, the organisation responsible for maintaining barcode standards, over 5 billion barcodes alone are scanned every day.

Variations in the quality of marks produced by an industrial printer can cause reading and scanning errors for the final product, and indicate underlying issues with the printer itself. Common errors including low contrast and mark inconsistency are often associated with incorrect printer settings, e.g. printhead distance, speed etc., printhead problems, e.g. degradation, or substrate incompatibilities. In addition, poor mark quality may indicate a suboptimal printing environment which suffers from contamination by dust or condensation. Mark variation may also remain invisible to a human operator for some time, due to the high resolution of many industrial units enabling very small-scale features to be printed.

Under certain conditions, the human eye is estimated to have a viewing resolution of 170 dots-per-inch (dpi). This value is comparable to the minimum 150 dpi of a typical high-resolution in for example a carton ink jet printing process. However, research suggests that human vision reflects only an approximation of the full content of a scene—a human views only the "gist" of what is visible. This provides limitations to the ability of the human eye to detect variations between visually similar images or marks. Humans are better at detecting change in an image when that image is structured or ordered, rather than its contents randomly distributed throughout.

Techniques have been developed that allow minute variations in visual digital media to be identified and magnified or decreased. Previous research on motion magnification has allowed humans to detect small vibrations in video, enabling the reconstruction of an audio signal associated with the observed vibrations. Leading from this, further research has seen the development of algorithmic methods for augmenting small variations in images of repeating structures. The process takes a single image as input, and searches within that image for repeating patterns. The algorithm then uses these patterns to smooth or amplify differences in colour or geometry across the image. Applications for the method may include visual inspection methods, whereby any defect in a repeating structure may be magnified to ease detection by human or automatic means.

Therefore, there is a need to at least mitigate or solve these issues.

SUMMARY

An objective of embodiments herein is therefore to obviate at least one of the above disadvantages and to provide improved handling of variations in printed marks.

According to a first aspect, the object is achieved by a method performed by a system for handling variations in a mark printed by a group of industrial printers. The system obtains images of the printed mark printed by each of the printers in the group. The system creates a composite image from the obtained images. The printed marks appear as a repeating pattern in the composite image. The system compares the printed marks in the composite image to each other or to another mark. The system detects variations with a first resolution in the printed marks in the composite image as a result of the comparison. The system creates an augmented image in which the detected variations are augmented to a second resolution. The first resolution is lower than the second resolution.

According to a second aspect, the object is achieved by a system for handling variations in a mark printed by a group of industrial printers. The system is adapted to obtain images of the printed mark printed by each of the printers in the group. The system is adapted to create a composite image from the obtained images. The printed marks appear as a repeating pattern in the composite image. The system is adapted to compare the printed marks in the composite image to each other or to another mark. The system is adapted to detect variations with a first resolution in the printed marks in the composite image as a result of the comparison. The system is adapted to create an augmented image in which the detected variations are augmented to a second resolution. The first resolution is lower than the second resolution Since the printed marks in the composite image are compared to each other or to another mark, variations can be detected and provided with a second resolution in the augmented image. Thus, the handling of variations in the printed marks is improved.

Embodiments herein afford many advantages, of which a non-exhaustive list of examples follows:

One advantage of the embodiments herein is that they enable a human operator to compare a relative printer mark quality within a printer network, facilitating the identification of variations in mark quality between printers and over time. The embodiments herein also allow the operator to visualise the variation in mark quality between printers. Mark variations are typically very small, and while they may affect the ability of a printed mark to be, for example, scanned in a shop, a human operator may not be able to observe the variation optically.

Another advantage of the embodiments herein is that they enable tailored and adaptable selection of printer groups to generate mark variability comparisons that may be used to identify relative differences, ensuring that a uniform mark is produced across all printers in the group. Numerous printer combinations may be automatically selected and compared in order to facilitate the detection of mark variability and identification of its cause.

A further advantage of the embodiments herein is that they enable rapid and intuitive operator identification of mark variation between printers, allowing the operator to initiate improvements or repairs of printers with high mark variability.

Furthermore, an advantage of the embodiments herein is that they enable identification of mark variability early in the printing process, resulting from augmentation of the human operator's ability to detect variation. Losses due to catastrophic mark variation or unexpected downtime for printer maintenance may be prevented as a result.

A further advantage of the embodiments herein is that they enable detection of external factors which otherwise are difficult to detect, e.g. the operating environment around the printer which causes variations in the marks.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Variation in printed marks can indicate underlying machine issues, which may negatively affect the production line due to unscheduled maintenance and product recalls. Detecting variation at an early stage is particularly difficult for human operators, as differences initially might only be observed in a few dots per inch in each mark. The embodiments herein therefore allows grouping of printers in such a way as to detect minute mark variations occurring between the printers, indicating both that variation is occurring and its location in the mark. This allows comparison of the print settings, processes and other environmental factors between the grouped printers to identify the root cause of the variation. By identifying the provenance of mark variations, manufacturers can anticipate maintenance requirements and prevent losses due to product wastage and unplanned downtime.

Figure 1A:
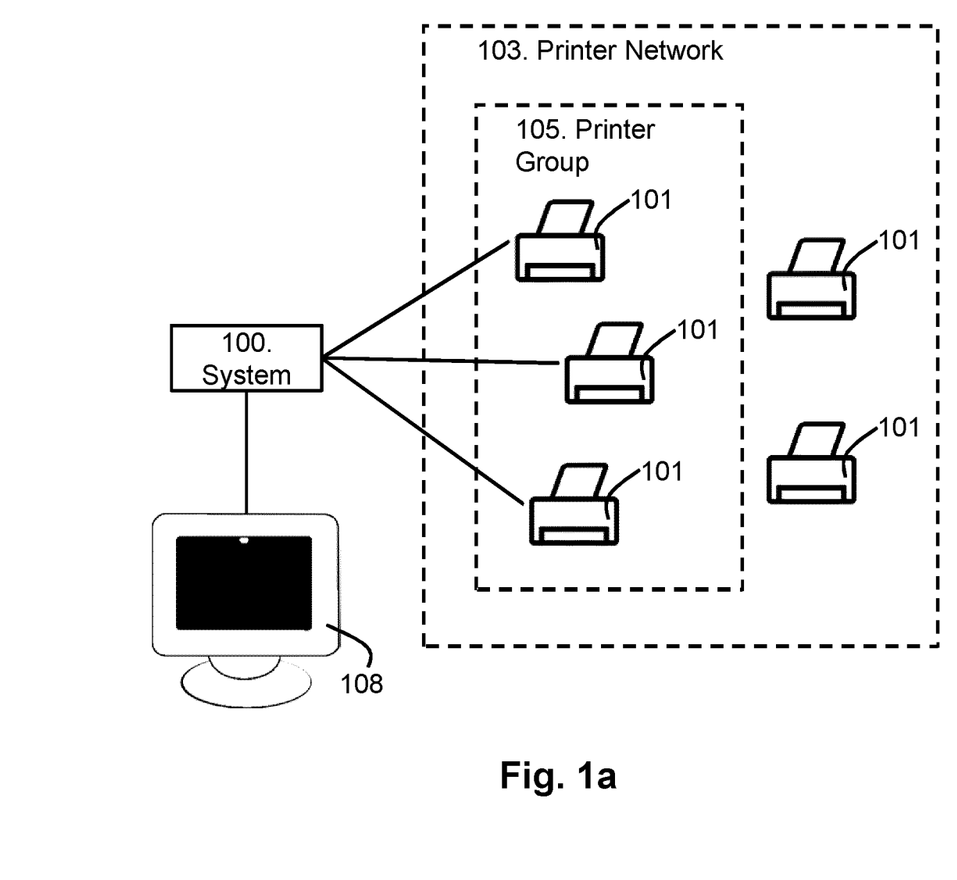
FIG. 1a is a schematic drawing illustrating an example of a system.
Figure 2:
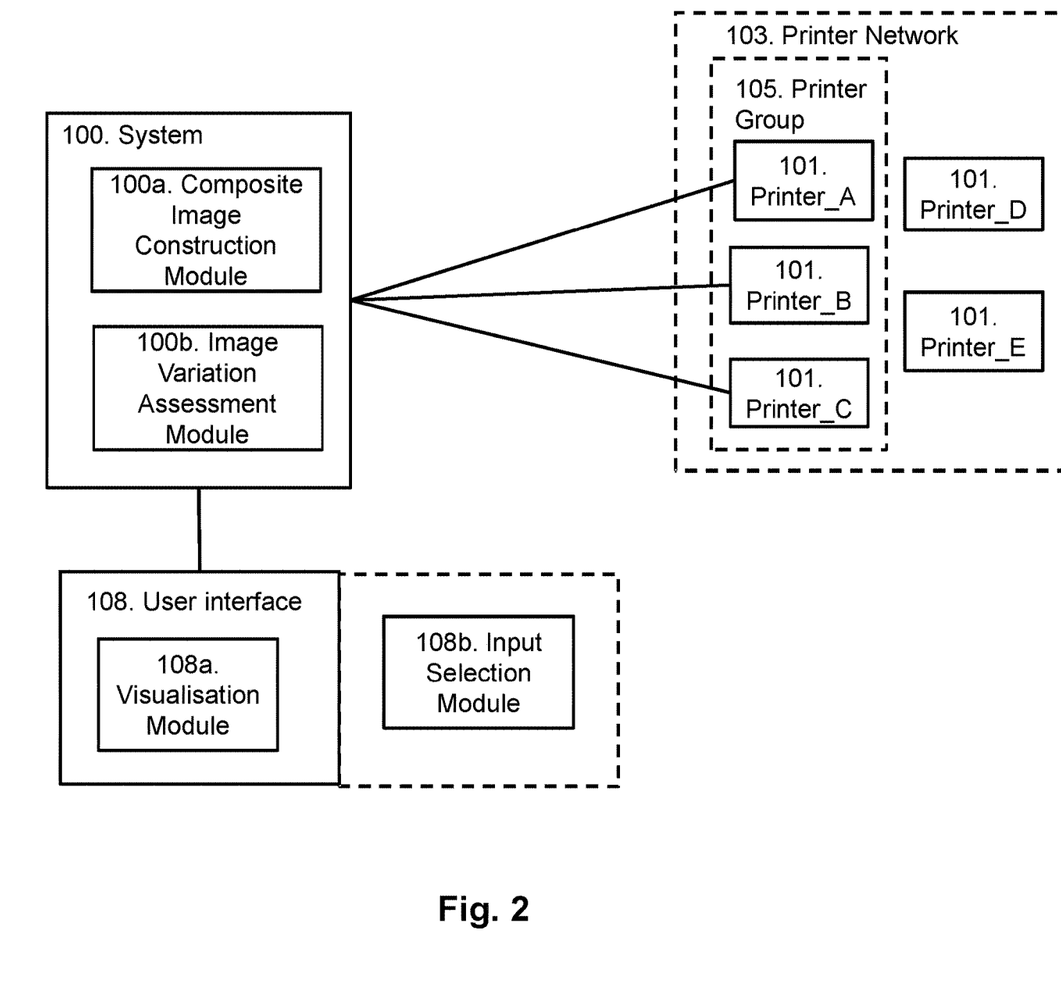
FIG. 2 is a schematic drawing illustrating an example of a system.

FIG. 1a is a schematic drawing illustrating an example of a system 100. The system 100 may be any suitable device, mobile or stationary, enabled to be adapted to and to communicate over a communications connection with at least one industrial printer 101. The system 100 may comprise for instance but not limited to e.g. a user equipment, mobile phone, smart phone, sensors, meters, vehicles, household appliances, medical appliances, media players, cameras, Machine to Machine (M2M) device, Internet of Things (IOT) device, terminal device, communication device, tablet computer, laptop or Personal Computer (PC). The system 100 may be portable, pocket storable, hand held, computer comprised, enabled to communicate voice and/or data, via the communications connection, with another entity, such as another system or a server. The system 100 may be operated by an operator. The system 100 may be adapted to execute algorithms or computer programs. The system 100 may comprise various sub subsystem or modules, and one example of this is illustrated in FIG. 2 described below.

The system 100 is adapted to be connected to one, two or more industrial printers 101. An industrial printer 101 is configured to mark various types of substrates with different types of patterns. This may also be described as the printer 101 is adapted to print a mark on a substrate or object. One example of an operation of such an industrial printer 101 is the marking of patterns on various types of packages or consumer goods e.g. on a packaging line or a manufacturing assembly line. The term industrial in industrial printer, industrial printer system and industrial printing may refer to that it is related to or characterized by industry, that it is designed or suitable for use in industry. Industry may be described as the process of making products by using machinery and factories. In industry, the environmental conditions may be variable in time, the ambient temperatures may vary etc. For the sake of simplicity, the term printer 101 may be used herein when referring to the industrial printer 101. The example in FIG. 1a illustrates five printers 101, but any other n number of printers 101 is applicable, where n is a positive integer.

A printer network 103 comprises a plurality of printers 101. Some of the printers 101 in the printer network 103 may be grouped in one or more printer groups 105. The printer network 103 is illustrated with the outer dotted box and the printer group 105 is exemplified with the inner dotted box. In FIG. 1a, the printer network 103 is exemplified to comprise five printers 101, and the printer group 105 comprises three of the printers 101 in the printer network 103. Two of the printers 101 in the printer network 103 exemplified in FIG. 1a are not comprised in any printer group 105, but they may be comprised in another printer group 105 in another example. Even though FIG. 1a illustrates an example with one printer group 105, any other m number of printer groups 105 is equally applicable, where m is a positive integer. The printer network 103 may comprise a larger number of printers 101 than a printer group 105, or the printer network 103 may comprise the same number of printers 101 as a printer group 105. The group 105 may be seen as a subset of the printer network 103.

Thus, the printer group 105 is a group of printers 101 selected from the wider printer network 103 for comparison to each other. At the time a comparison of printed marks is made, each printer 101 in the printer group 105 will be printing the same mark.

The variability of the mark of interest will be used for comparison of the printers 101. Mark variability may manifest as differences in parameters comprising for example at least one of:

Colour, and/or

Geometry, and/or.

Opacity etc.

Multiple printer groups 105 may also be defined, in order to provide in-depth relative information about each printer 101 compared to its peer printers 101. During analysis, a particular printer 101 may be included in one or more printer groups 105. A printer group 105 may be composed of:

- Similar printers 101 within the same factory.
- Printers 101 coding the same mark on different substrates.
- Printers 101 operating across different factory locations.
- Printers 101 controlled and/or maintained by different technicians or operators.
- Printers 101 operating at different settings.
- Other variables from which performance information may be obtained.

The mark printed by printers 101 in the printer group 105 may also be compared to prior marks known to have:

- Low variability, which represent an ideal or optimal version of the mark being analysed.
- High variability, which represent worst-case versions of the mark being analysed.
- Been acquired at specific points across the operating period of printers 101 within the printer group 105, e.g. after recalibration, after every 400 marks etc. Specific acquisition points may be used for long-term data tracking, giving an accurate indication of performance with use.

The connection between the industrial printers 101 and the system 100 may be a wireless or wired connection. The connection may use any suitable protocol depending on type and level of layer, e.g. as indicated by the Open Systems Interconnection (OSI) model, as understood by the person skilled in the art. The connection may be a direct connection or a connection that goes via some other unit (not shown in FIG. 1*a*).

The system 100 and the industrial printers 101 may be located at substantially the same physical location, or they may be located at different physical locations.

FIG. 1*a* further illustrates a user interface 108 which is adapted to be connected to the system 100, or the printer 101 or to both the system 100 and the printer 101. The user interface 108 may be integrated in or co-located with the system 100 or it may be a standalone user interface 108 adapted to be connected to the system 100 and/or the printer 101. An operator of the system 100 may view the user interface 108. The operator may also interact with the user interface 108, e.g. providing commands to the printer 101 via the user interface 108, manipulating images printed by the printers 101, initiate setting changes of the printer 101 etc. The user interface 108 may also be referred to as a display, a screen, a monitor, a touch screen, an output module etc. The user interface 108 may comprise various modules and one example of this is illustrated in FIG. 2 described below. A trained user may access and control aspects of the mark variability analysis process through the user interface 108. The user interface 108 may be adapted to provide one-way communication to the operator or adapted to provide two-way communication with the operator. Using other words, the user interface 108 may be non-interactive or interactive. When the user interface 108 is non-interactive it may be adapted to only display information and data to be viewable by the user, i.e. it is adapted to allow a one-way communication from the system 100 and/or the printer 101 to the user. The user interface 108 may be an interactive user interface in that it is adapted to allow two-way communication between the system 100 and/or the printer 101 and the user, i.e. the user interface 108 responds to the user's input. When the user interface 108 is an interactive user interface it may comprise an input module and an output module. The user may also be referred to as an operator.

Figure 1B:
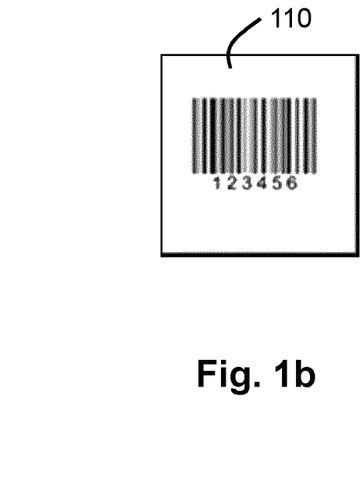
FIG. 1b is a schematic drawing illustrating an example of a printed mark.

FIG. 1*b* illustrates an example of a mark 110 printed by the industrial printer 101. The mark 110 may be any mark 110 suitable to be printed on a substrate (not shown), such as barcode, QR code, image, fonts, graphics, codes, etc. The mark 110 may be of any suitable size and color. Even though the mark 110 is exemplified as a barcode in FIG. 1*b*, any other type of mark 110 is equally applicable herein.

FIG. 2 is a schematic drawing illustrating another example of the system 100. The printer group 105 is exemplified in FIG. 2 to comprise five printers 101. However, the printer group 105 may comprise any other suitable n number of printers 101, where n is a positive integer. The system 100 may comprise various sub subsystem or modules such as e.g. a composite image construction module 100*a* and an image variation assessment module 100*b*. The user interface 108 may comprise various subsystems or modules such as e.g. a visualization module 108*a* and an input selection module 108*b*. The visualization module 108*a* may or may not be comprised in the user interface 108. The input selection module 108*b* may be a standalone module or it may be co-located in the user interface 108. The input selection module 108*b* may be co-located in the user interface 108 in the form of the user interface 108 being for example a touch screen, it may be keyboard adapted to be connected to the system 100 and/or the printer 101 etc. These modules will be described in more detail with reference to FIGS. 4 and 5 below.

Figure 3:
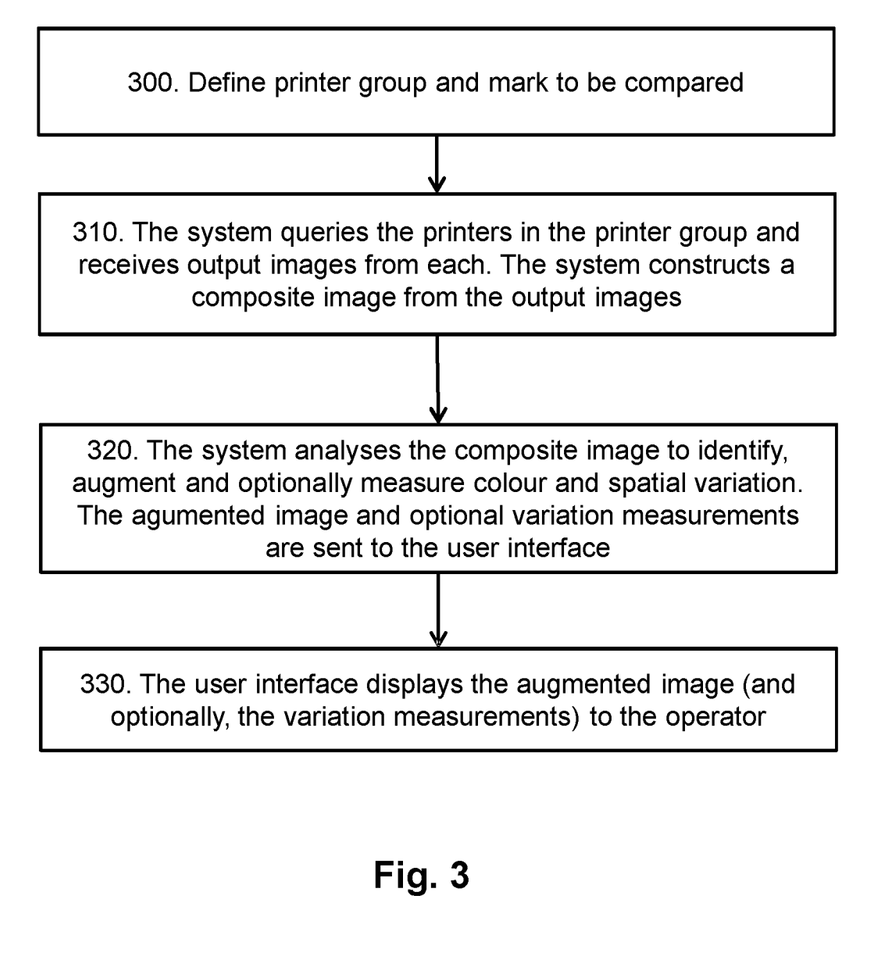
FIG. 3 is a flow chart illustrating an example of a method.

The method for for handling variations in a mark 110 printed by a group 105 of industrial printers 101, according to some embodiments will now be described with reference to the flowchart in FIG. 3. In short, FIG. 3 illustrates a process for enabling the identification of relative variability in printed marks 110 for example via the human eye. It also illustrates adaptive grouping of printers 101 allowing mark variability to be identified across various machines and locations. An operator of the system 100 intends to assess mark variability across a particular printer group 105, where each printer 101 in the printer group 105 is producing substantially the same mark 110. The marks 110 produced by the printer group 105 may appear identical to the human eye.

The method comprises at least one of the following steps, which steps may as well be carried out in another suitable order than described below:

Step 300

The operator may access the user interface 108 and initiates defining of the printer group 105 and the mark 110 to be compared, or the system 100 may initiate defining of the printer group 105 and the mark 110 to be compared. The operator may access the user interface 108 for example via the input selection module 108*b*.

The printer group 105 may be defined:
a) manually by the operator via the user interface 108, or
b) automatically by the system 100, e.g. as a function of the input selection module 108*b*. The system 100 may automatically define the printer group 105 based on prescheduled requirements, e.g. weekly or daily checks.

The operator of the system 100 may identify a specific printer 101, the printer group 105, the mark 110 or other parameter(s) for comparison, and the system 100 may auto-populate the printer group (or groups) 105 with other printers 101 in the printer group 105.

Information indicating the printer group 105 may be sent from the input selection module 108*b* of the user interface 108 to the system 100, e.g. to the composite image construction module 100a in the system 100.

Step 310

The system 100 obtains an image from each printer 101 in the printer group 105. The obtained image may be referred to as an output image. This may be done by that the system 100, e.g. by the composite image construction module 100a, queries the printers 101 in the printer group 105 and receives output images from at least some of the printers 101. Instead of querying and receiving output images from the printers 101, the system 100 may query and obtain output images from at least one image capturing device (not shown) adapted to capture images of marks printed by the printers 101.

A composite image may be constructed from at least some of the output images, or for all output images. For example, the composite image construction module 100a may construct the composite image from the output images and may send it to the image variation assessment module 100b for assessment.

The output images from the printers 101 may also be obtained retrospectively from an image cache or memory associated with each printer 101 or the system 100. The images in the image cache may have been obtained by an image capturing device connected to the printers 101. The image cache may store the output images for a certain period of time, e.g. over a 24-hour period, along with sampled images obtained over a longer time span. In this way, reference output image sets are available to the system 100, e.g. its composite image construction module 100a, that increases the potential range of printer group comparisons and increase the temporal accuracy of fault detection. The image cache may be located in close proximity to the system 100, it may be comprised in the system 100, it may be adapted to be connected to the system 100 and/or the printer 101, it may be a cloud memory etc.

Step 320

The system 100 analyses the composite image to identify, augment and optionally measure color and spatial variation in the composite image. The variations may be of a first resolution. The first resolution may be a subpixel resolution. The first resolution may be such that the variation is invisible to the human eye. The analysis may be done by comparing the output images to each other to identify any variability between them. The detected difference is then optically magnified to make the subtle variations visible to the human eye. When magnified, the variations may be of a second resolution. The first resolution is lower than the second resolution. The second resolution may be a pixel resolution. The second resolution may be visible to the human eye. The analysis may be performed for example by the image variation assessment module 100b comprised in the system 100. The analysis results in creation of an augmented image.

Optionally, the variation measurements are also obtained by system 100, e.g. by the image variation assessment module 100b.

Step 330

The augmented image is sent from the system 100 to the user interface 108 to be displayed with the second resolution. For example, the augmented image may be displayed by the visualization module 108a. Optionally, the color and spatial variation measurements may also be sent to the user interface 108 and displayed to the operator. When at the second resolution, the variations shown by the augmented image may be visible to the human eye of the operator.

The operator views the augmented image, and optionally also the variation measurements, via the user interface 108, e.g. via the visualisation module 108a of the user interface 108.

Optionally, the operator or the system 100 defines a further composite image subset for further visual analysis based on the assessment of the augmented image. This may be carried out using e.g. a subset generation module, utilised via the user interface 108.

Figure 4:
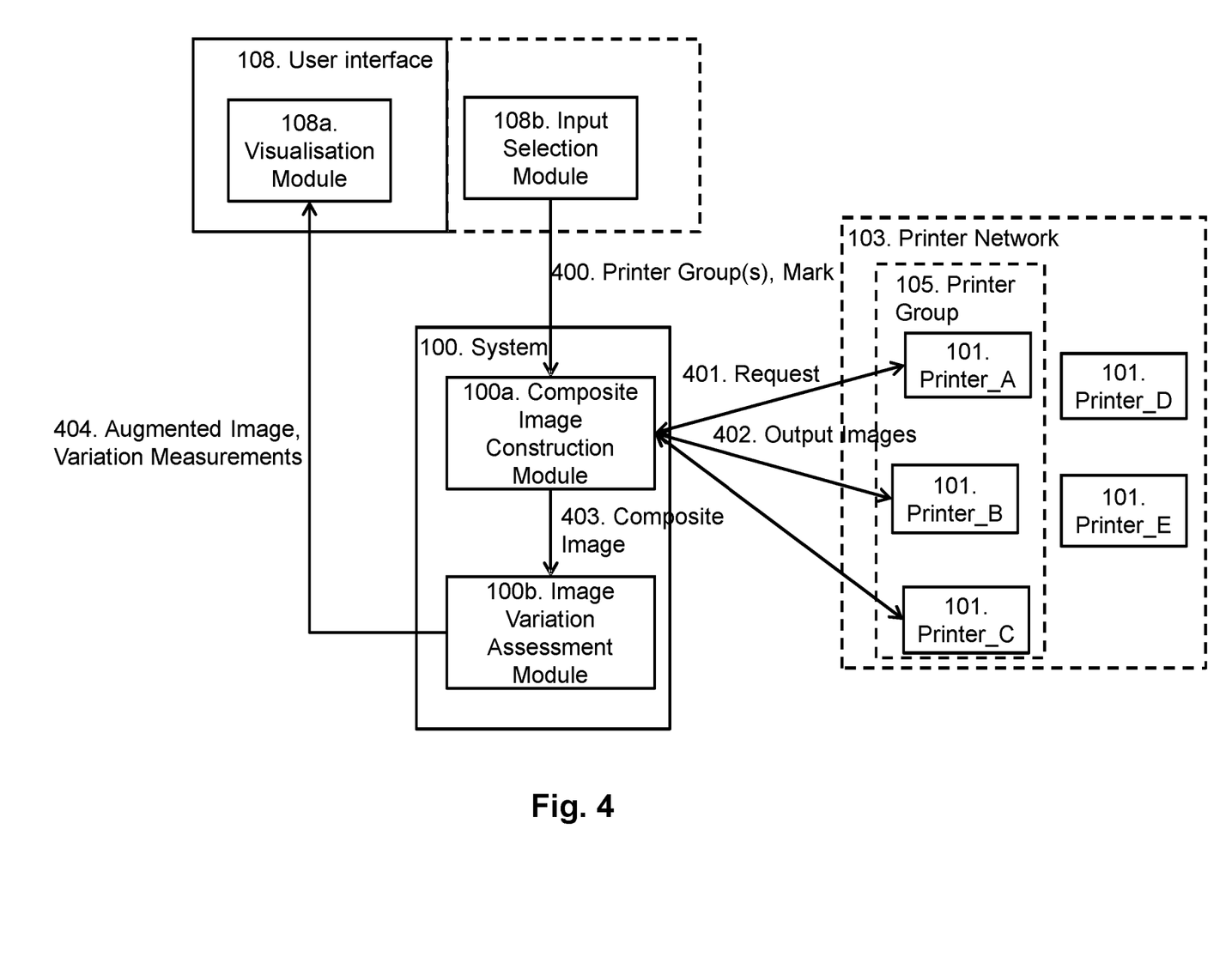
FIG. 4 is a schematic drawing illustrating an example of a method.

FIG. 4 is a flow chart illustrating an example of the method for handling variations in a mark 110 printed by a group 105 of industrial printers 101. The method comprises at least one of the following steps, which steps may be performed in any suitable order than described below:

Step 400

This step corresponds to step 300 in FIG. 3. The printer group 105 may be selected by the operator e.g. using the input selection module 108b or it may be automatically selected by the system 100 itself, in addition to selection of the mark 110 to be used in the analysis. Information about the printer group 105 and the mark 110 is provided to the system 100. The input selection module 108b may be a standalone input selection module 108b such as for example a keyboard, a mouse device, a joystick etc., or it may be co-located with the visualisation module 108a in the user interface 108. When co-located, the input selection module 108b may be the feature of the user interface 108 enabling two-way communication between the user and the system 100, for example in the form of a touch screen.

In one alternative, the operator may define the parameters of the mark variability analysis process via the user interface 108, e.g. via the input selection module 108b. This may include:

Selecting the printer group 105 from the printer network 103 for which printed marks 110 will be compared.

Selecting the mark 110 which will form the basis of the comparison.

Alternatively, the system 100 may automatically select the printer group 105 and/or the mark 110 and it may be able to identify parameters, equipment and processes for comparison. In this alternative the operator might, for example, identify a specific printer 101 for which a printed mark 110 is to be compared. The system 100 may then identify other printers 101 currently producing the same mark 110 and assign them to the printer group 105.

Selection of the printer group 105 may be undertaken by the operator via the user interface 108 or by the system 100 upon request or automatically on a predetermined schedule. The printer group 105 selection may be made based on the specific requirements of the analysis.

The results of the mark variability analysis may be presented to the operator via the user interface 108, e.g. via the visualisation module 108a. The user interface 108, e.g. the visualisation module 108a, allows the operator to visually assess and act on any variability between marks 110. The results presented may include images, measurements and other relevant data. Other relevant data may include any information which may help to identify the causes of variation, such as temperature, ink brand, dates of previous maintenance etc.

Steps 401-402

These steps correspond to step 310 in FIG. 3. The system 100, e.g. the composite image construction module 100a, uses the printer group information supplied by the user interface 108, e.g. the input selection module 108b, from step 400, to request images of the mark 110 from each relevant printer 101. The images may instead be requested from an image capturing device (not shown) which is adapted to capture the images of the marks 110 printed by the printers 101. Such image capturing device may be a standalone device or it may be co-located in the printer 101. The images may be referred to as output images. The output images may be captured by an imaging system built-in to each printer 101 in the printer group 105. The imaging system may produce output images in any sensing modality. Each output image may be tagged with a unique ID number, e.g. a printer ID, allowing the originating printer 101 to be identified if necessary. Output images may be cached or stored by a printer 101 or an external memory, e.g. a cloud memory or a system memory, for a certain period of time, allowing past images to be compiled into a reference group as required to provide an assessment of variation over time. Each requested printer 101 or image capturing device sends the image of the mark 110 back to the system 100.

The system 100, e.g. via the composite image construction module 100a, is adapted to create a composite image composed of the images of the mark 110 produced by each of the printers 101, e.g. the output images from the printer group 105. When more than one printer group 105 is being compared, a composite image may be produced for each printer group 105 and tagged with an appropriate image identifier, e.g. a composite image ID.

The comparison undertaken by the system 100 may take input from a number of printer groups 105 in order to separate and identify multiple causes of variation, or the development of variation over time. The "comparison" refers to that a number of output images are compared in order to detect variations between them.

The system 100, e.g. via the composite image construction module 100a, may create a single composite image for each printer group comparison.

The composite image may be constructed such that small variations between the marks 110 shown in the output images may be visible to the system 100. The variations may be of a first resolution, and this may be for example as subpixel resolution. Variations with the first resolution may not be visible to the human eye.

The output images included in each composite image may be automatically varied by the system 100 via the selection of the printer groups 105 in such a way as to obtain the required comparison and analysis, i.e. incorporating various comparative parameters and their effects on variability over time.

The marks 110 in the output images may be shown in full in the composite image, or a smaller mark section, e.g. a mark subsection, may be selected for analysis from the output image. The mark subsection may be automatically selected by the system 100, e.g. by the composite image construction module 100a. Alternatively, the operator may manually select the mark subsection by using the user interface 108.

The marks 110 or mark subsections in the composite image take the form of an array of repeating structures. Optionally, the system 100, e.g. the composite image construction module 100a, may incorporate a further component which may enable the system 100 to correct for or separate different sources of variation. For example, colour variation may be occurring between printers 101 due to the use of slightly different ink types/levels, but the operator may be searching specifically for a vibration or mark geometry problem.

Step 403

This step corresponds to step 320 in FIG. 3. The composite image may be provided from the composite image construction module 100a to the image variation assessment module 100b. The image variation assessment module 100b is a module adapted to assess the composite image for variability of the first resolution between marks 110. The image variation assessment module 100b may perform at least one of the following: identification, augmentation and measurement:

Identification: The image variation assessment module 100b may detect small variations between marks 110 in the composite image(s) at the first resolution, e.g. at subpixel resolution, i.e. that are invisible to the human eye.

Augmentation: The image variation assessment module 100b may alter the detected variations, augmenting the composite image by magnifying the differences between the marks 110. The magnified features are compiled into a new augmented composite image. The term augmented image will be used herein for the sake of simplicity when referring to the augmented composite image. Where more than one printer group 105 is being compared, an augmented image may be generated for each associated composite image. Optimum augmented images for visual inspection, i.e. resulting from printer group selection combinations, may be automatically constructed at regular intervals or when required and based on numerous factors, such as failure likelihood, use of a new ink type, environmental variations, registered faults or vibration-causing incidents. The augmented image may be of the second resolution, which is higher than the first resolution.

Measurement: The image variation assessment module 100b may optionally measure the detected variations compiling data that may be used to precisely quantify the subtle differences between the marks 110. The detected variations may be referred to as variation measurements.

A subset of the output images comprised in the composite image may be extracted for further analysis. The subset of the output images may be referred to as a composite image subset. The generation of the subsystem may be performed by a subset generation module (not shown) comprised in the system 100.

The subsets may be composed of, for example at least one of:

Output images showing a complete mark 110.

Mark subsections.

The composite image subset may be selected to, for example, target marks 110 produced by a particular printer 101 within the printer group 105, or a particular mark subsection that is known to be problematic.

The generation of the subset may be initiated after generation of the augmented image(s), in such a way as to allow the operator to visualise specific combinations of images, printers or setting groups. In one alternative, the subset may be generated after an initial manual inspection of the augmented image by the operator when the number of output images comprised in the augmented image is sufficiently small. In another alternative, the subset may be automatically generated, whereby the system 100 may select those output images exhibiting the greatest variation and combine them with output images within the median variance band to highlight the printers/time periods etc. where the variation is occurring.

Step 404

This step corresponds to step 330 in FIG. 3. The outputs from the image variation assessment module 100b, i.e. the augmented image and optional the variation measurements, may be transmitted to the user interface 108, e.g. the visualisation module 108a, where they may be presented in such a way as to allow the operator to intuitively determine the level of mark variability and the originating printer(s) 101. Instead of sending the outputs to the user interface 108, the outputs may be processed by the system which automatically determines the level of mark variability and the originating printer(s) 101, with or without input from the operator.

From this analysis, the operator or the system 100 may initiate additional actions to deduce the potential cause of the variability. These additional actions may be for example sensor placement and printing parameter adjustment.

Figure 5:
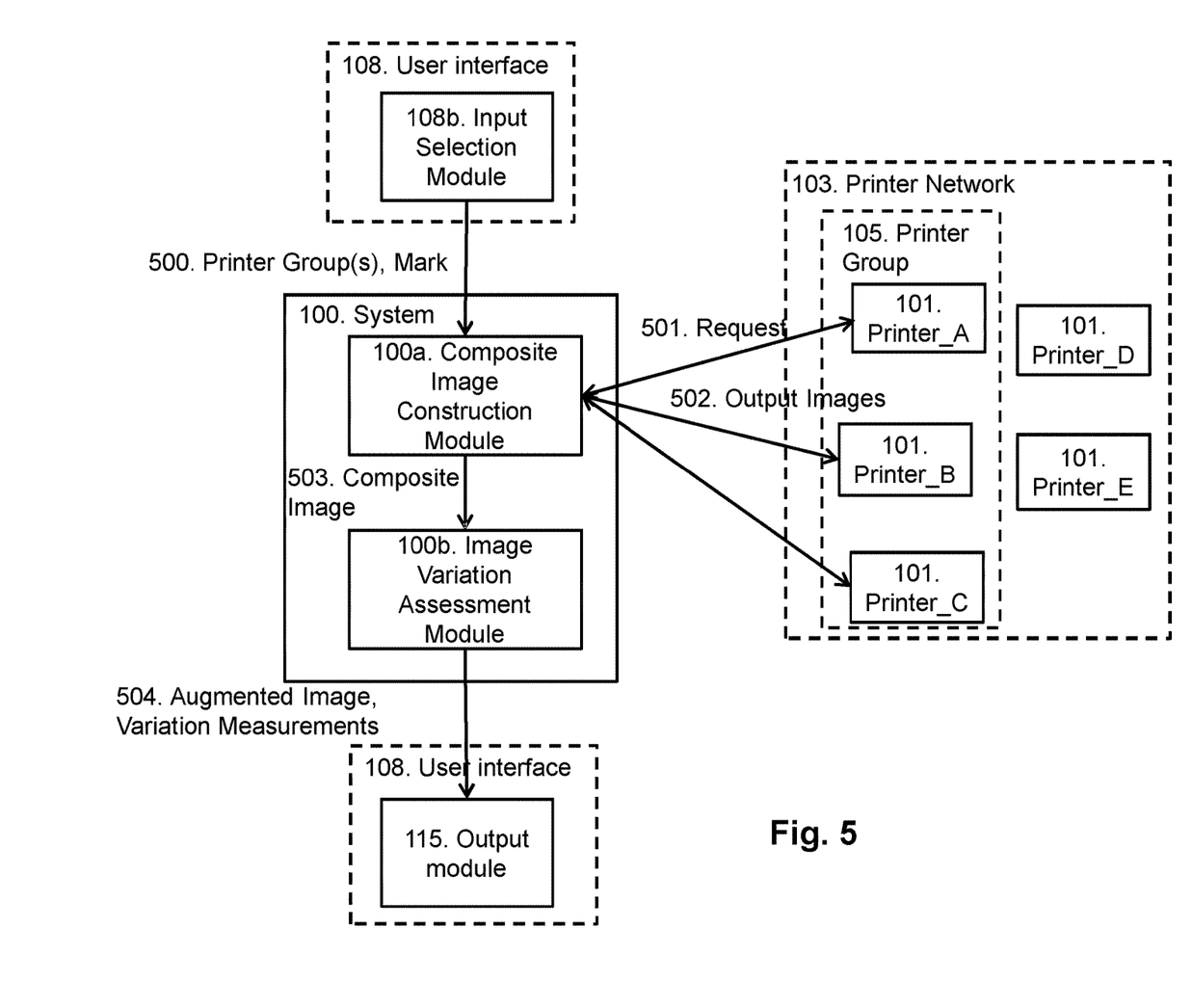
FIG. 5 is a schematic drawing illustrating an example of a method.

A step similar to step 504 described below may be performed before or after step 404, but is not illustrated in FIG. 4.

FIG. 5 is a flow chart illustrating an example of the method for handling variations in a mark 110 printed by a group of industrial printers 101. The difference between the examples in FIGS. 4 and 5 is in step 404 and 504. In other words, the other steps are the same in both examples. The method comprises at least one of the following steps, which steps may be performed in any suitable order than described below:

Step 500

This step corresponds to step 300 in FIG. 3 and step 400 in FIG. 4. The printer group 105 may be selected by the system 100 or selected by the operator for example via the input selection module 108b, in addition to selection of the mark 110 to be used in the analysis. Information about the printer group 105 and the mark 110 is provided to the system 100.

Further details regarding this step are described under step 400 earlier. The input selection module 108b may be seen as part of the user interface 108, as indicated with the dotted box, or it may be a standalone input selection module 108b.

Steps 501-502

This step corresponds to step 310 in FIG. 3 and steps 401-402 in FIG. 4. The system 100, e.g. the composite image construction module 100a, uses the printer group information supplied by the user interface 108, e.g. the input selection module 108b, from step 500, to request images of the mark 110 from each relevant printer 101 or from an image capturing device (not shown). Each requested printer 101 or the image capturing device sends the image of the mark 110 back to the system 100.

The system 100, e.g. via the composite image construction module 100a, is adapted to create a composite image composed of the images of the mark 110 produced by each of the printers 101, e.g. the output images from the printer group 105. The composite image is of a first resolution, which is lower than a second resolution of an augmented image described later. The first resolution may be a subpixel resolution.

Further details regarding these steps are described under step 401-402 above.

Step 503

This step corresponds to step 320 in FIG. 3 and to step 403 in FIG. 4. The composite image may be provided from the composite image construction module 100a to the image variation assessment module 100b. The image variation assessment module 100b receives the composite image and creates the augmented image. The image variation assessment module 100b may also obtain variability measurements related to the composite image and/or the augmented image. The variations shown in the augmented image may be of a second resolution which is higher than the first resolution of the composite image. The second resolution may be a pixel resolution. The second resolution enables variations between the images to be visible by the human eye.

Additional details regarding this step are the same as described under step 403 earlier.

Step 504

This step may be different from the method exemplified in FIG. 4. The output from the image variation assessment module 100b, i.e. the augmented image and optionally the variability measurements, may be transmitted to an additional system component referred to as an output module 115 where it may be automatically utilised to initiate variability-reducing process adjustments in each printer 101 or additional investigative steps such as sensor operation. The output module 115 may be comprised in the user interface 108, as indicated with the dotted box, or it may be a standalone output module 115.

Using other words, step 504 may be described as a step where the outputs from the image variation assessment module 100b, i.e. the augmented image and optionally the variability measurements, may be utilised to trigger automated processes in the printers 101 comprised in the printer group 105.

When the output module 115 receives the augmented image and possibly the variation measurements from the image variation assessment module 100b, it may trigger one or more processes which may include gathering of sensor data or changing printer settings. The triggered processes may be automated or non-automated. The results of the action initiated by the output module 115, e.g. in the form of a data stream or visualisation, status update etc., may be fed back to the user interface 108 for assessment or approval by the operator or the system 100.

A step similar to step 404 in FIG. 4 may be performed before or after step 504, but is not illustrated in FIG. 5.

Figure 6:
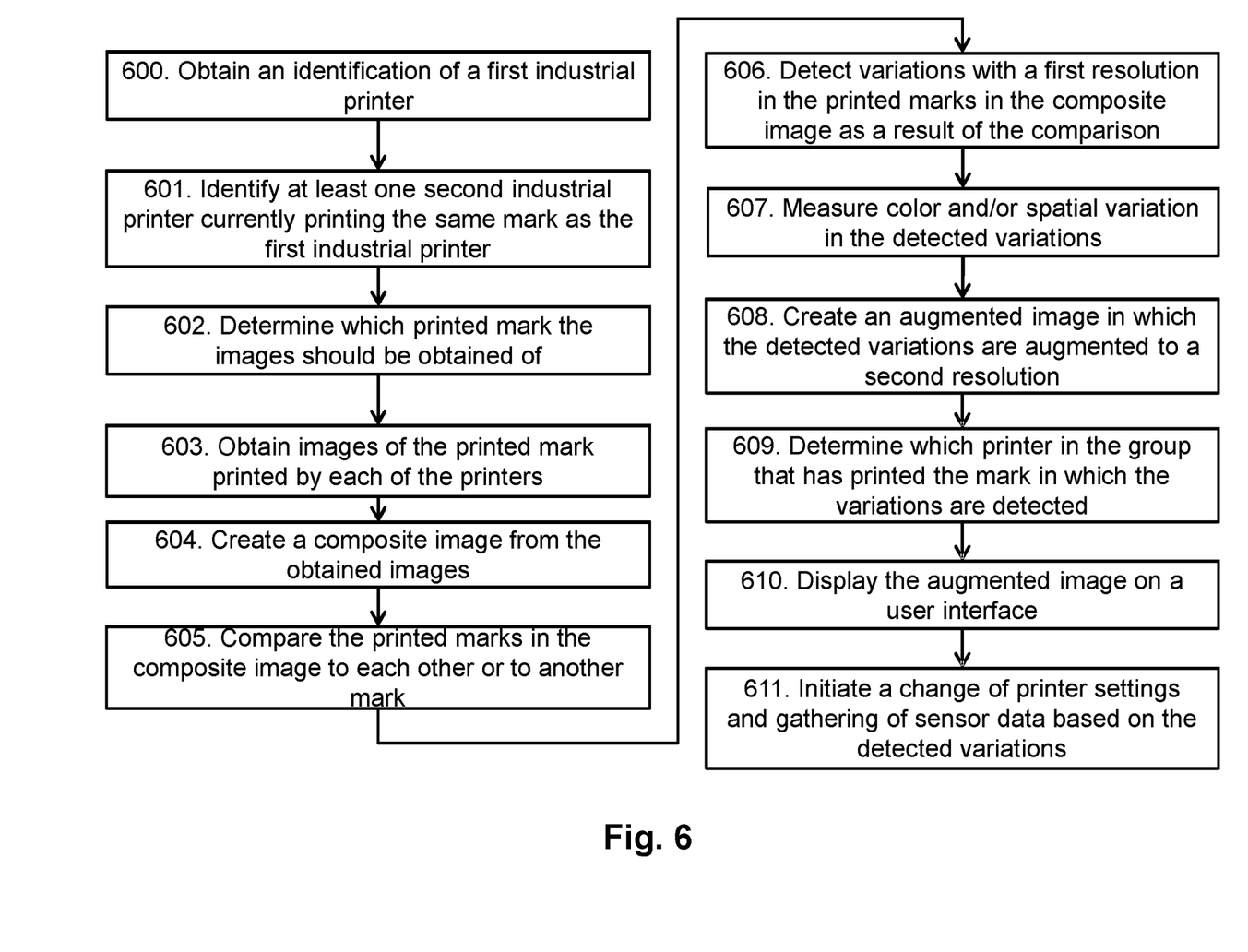
FIG. 6 is a flow chart illustrating an example of a method.

The method described above will now be described seen from the perspective of the system 100. FIG. 6 is a flowchart describing the present method performed by the system 100 for handling variations in a mark 110 printed by a group 105 of industrial printers 101. The method comprises at least one of the following steps to be performed by the system 100, which steps may be performed in any suitable order than described herein:

Step 600

This step corresponds to step 300 in FIG. 3, step 400 in FIG. 4 and step 500 in FIG. 5. The system 100 may obtain an identification of a first industrial printer 101.

The identification of the first industrial printer 101 may be obtained from an operator, from the system 100, from another system or from a user interface 108.

Step 601

This step corresponds to step 300 in FIG. 3, step 400 in FIG. 4 and step 500 in FIG. 5. The system 100 may identify at least one second industrial printer 101 currently printing the same mark 110 as the first industrial printer 101. The first industrial printer 101 and the second industrial printer 101 may be comprised in the printer group 105.

Step 602

This step corresponds to step 300 in FIG. 3, step 400 in FIG. 4 and step 500 in FIG. 5. The system 100 may determine which printed mark 110 the images should be obtained of. The group 105 may comprise printers 101 printing the determined mark 110.

Step 603

This step corresponds to step 310 in FIG. 3, steps 401 and 402 in FIG. 4 and steps 501 and 502 in FIG. 5. The system 100 obtains images of the printed mark 110 printed by each of the printers 101 in the group 105.

Step 604

This step corresponds to step 310, 401, 402, 501, 502 in FIG. 5. The system 100 creates a composite image from the obtained images. The printed marks 110 appear as a repeating pattern in the composite image.

Step 605

This step corresponds to step 320 in FIG. 3, step 403 in FIG. 4 and step 503 in FIG. 5. The system 100 compares the printed marks 110 in the composite image to each other or to another mark.

The other mark 110 to which the printed mark 110 is compared may be at least one of:
- an original version of the printed mark 110, and/or
- a worst-case version of the printed mark 110, and/or
- a mark 110 printed by another group 105 of industrial printers.

Step 606

This step corresponds to step 320 in FIG. 3, step 403 in FIG. 4 and step 503 in FIG. 5. The system 100 detects variations with a first resolution in the printed marks 110 in the composite image as a result of the comparison. The variations may be in at least one of: color, geometry and opacity.

This step may comprise detecting the variations' location in the composite. The location may be represented by coordinates in e.g. an x-y coordinate system.

Step 607

This step corresponds to step 320 in FIG. 3, step 403 in FIG. 4 and step 503 in FIG. 5. The system 100 may measure color variation or spatial variation or both spatial and color variation in the detected variations.

Step 608

This step corresponds to step 320 in FIG. 3, step 403 in FIG. 4 and step 503 in FIG. 5. The system 100 creates an augmented image in which the detected variations are augmented to a second resolution. The first resolution is lower than the second resolution.

Step 609

This step corresponds to step 320 in FIG. 3, step 403 in FIG. 4 and step 503 in FIG. 5. The system 100 may determine, based on a printer ID, which printer 101 in the group 105 that has printed the mark 110 in which the variations are detected. Each obtained image may have a printer ID associated with the printer 101 which printed the mark 110.

Step 610

This step corresponds to step 330 in FIG. 3 and step 404 in FIG. 4. The system 100 may display the augmented image on a user interface 108.

Step 611

This step corresponds to step 330 in FIG. 3, step 404 in FIG. 4 and step 504 in FIG. 5. The system may initiate a change of printer settings and gathering of sensor data based on the detected variations.

Figure 7:
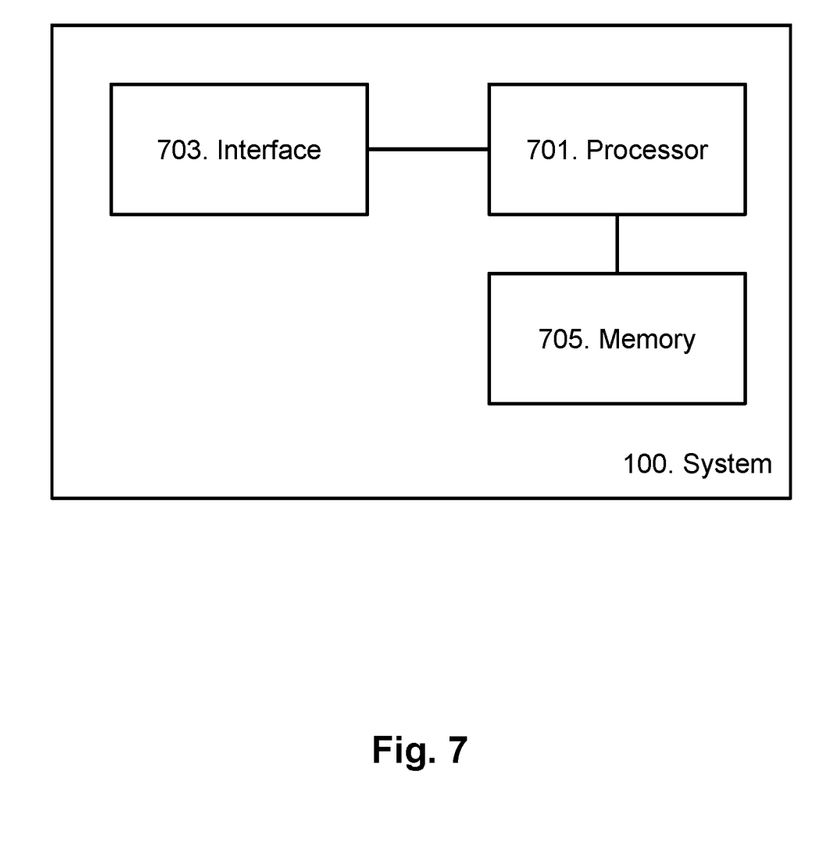
FIG. 7 is a schematic block illustrating an example of a system.

To perform the method steps shown in FIGS. 3, 4, 5 and 5 for handling variations in a mark 110 printed by a group 105 of industrial printers 101, the system 100 may comprise an arrangement as shown in FIG. 7.

The system 100 comprises a processor 701, an interface 703 and a memory 705, in which memory instructions are stored for carrying out the method steps explained above. The system 100 communicates via the interface 703. The interface 703 comprises both an external interface, communicating with a transmitter and receiver, and internal interfaces (not shown).

The processor 701 may comprise at least one of the composite image construction module 100a and/or the image variation assessment module 100b described above.

The system 100 is adapted to, e.g. by means of the processor 701, obtain images of a mark 110 printed by each industrial printer 101 in a group of industrial printers 105.

The system 100 is adapted to, e.g. by means of the processor 701, create a composite image from the obtained images. The printed marks 110 appear as a repeating pattern in the composite image.

The system 100 is adapted to, e.g. by means of the processor 701, compare the printed marks 110 in the composite image to each other or to another mark. The other mark 110 to which the printed mark 110 is compared may be:
- an original version of the printed mark 110, and/or
- a worst-case version of the printed mark 110, and/or
- a mark 110 printed by another group 105 of industrial printers.

The system 100 is adapted to, e.g. by means of the processor 701, detect variations with a first resolution in the printed marks 110 in the composite image as a result of the comparison.

The system 100 is adapted to, e.g. by means of the processor 701, create an augmented image in which the detected variations are augmented to a second resolution. The first resolution is lower than the second resolution.

The system 100 may be adapted to, e.g. by means of the processor 701, obtain an identification of a first industrial printer 101. The identification of the first industrial printer 101 may be obtained from an operator, from the system 100, from another system or from a user interface 108.

The system 100 may be adapted to, e.g. by means of the processor 701, identify at least one second industrial printer 101 currently printing the same mark 110 as the first industrial printer 101. The first industrial printer 101 and the second industrial printer 101 may be comprised in the same printer group 105.

The system 100 may be adapted to, e.g. by means of the processor 701, determine which printed mark 110 the images should be obtained of. The group 105 may comprise printers 101 printing the determined mark 110.

The system 100 may be adapted to, e.g. by means of the processor 701, measure color and/or spatial variation in the detected variations.

The system 100 may be adapted to, e.g. by means of the processor 701, determine, based on a printer ID which printer 101 in the group 105 that has printed the mark 110 in which the variations are detected. Each obtained image may have a printer ID associated with the printer 101 which printed the mark 110.

The system 100 may be adapted to, e.g. by means of the processor 701, display the augmented image on a user interface 108.

The system 100 may be adapted to, e.g. by means of the processor 701, initiate a change of printer settings and gathering of sensor data based on the detected variations.

The present mechanism for handling variations in a mark 110 printed by a group 105 of industrial printers 101 may be implemented through one or more processors, such as a processor 701 in the system arrangement depicted in FIG. 7, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the system 100. One such carrier may be in the form of a CD ROM disc. It is however feasible with other data carriers such as a memory stick. The computer program code can furthermore be provided as pure program code on a server and downloaded to the system 100.

A computer program may comprise instructions which, when executed on at least one processor, cause the at least one processor to carry out at least one of the method steps in at least one of the FIGS. 3, 4, 5 and 6. A carrier may comprise the computer program, and the carrier is one of an electronic signal, optical signal, radio signal or computer readable storage medium.

Summarized, the embodiments herein relate to:

A system 100 that enables a human operator to visually identify subtle variations in printed marks 110 based on the relative performance of grouped printers 105.

How to identify subtle variations in the quality of a printed mark 110 based on the relative performance of other printers 101.

How to group printers 101 such a way as to create advantageous comparison conditions that allow the operator or the system 100 to determine the location and cause of mark variation.

How to enable an operator or the system 100 to observe subtle variations in the appearance of printed marks 110 using e.g. the human eye.

How to improve printer fleet management by predicting maintenance requirements based on subtle mark variation between printers 101.

The methods described herein may be summarized as follows:

An operator or the system 100 wishes to assess the variation between marks 110 produced by certain printers 101 in a printer network 103, and identifies the relevant printers 101 to the system for example through a user interface 108.

The system 100 obtains images of marks 110 produced by each of the relevant printers 101, for example via an image capturing device or directly from the printer 101, and incorporates them into a first image referred to as a composite image where the printed marks 110 appear as a repeating pattern. The composite image is of a first resolution, e.g. a subpixel resolution.

The system 100 identifies any variation with a first resolution between the marks 110 and produces a second image referred to as an augmented image in which those variations are magnified to a second resolution so that they for example may be visible to the human eye. The augmented image is of a second resolution which is larger than the first resolution. The second resolution may be a pixel resolution.

The operator may view the augmented image through the user interface 108 and the operator or the system 100 may act on any observed variation between the marks 110, or the augmented image with the second resolution may be transmitted to the output module 115 where it may be utilised to initiate variability-reducing process adjustments in each printer 101 or additional investigative steps such as sensor operation.

Herein, a group of images from different printers 101 are used. The printers 101 may be located at different factories.

The embodiments herein provide a method for facilitating, manually or automatically, the selection of relevant printers 101 for advantageous performance comparison and printer diagnosis. The embodiments herein enable rapid and intuitive analysis of subtle mark variations for example by the human eye of a human operator. The embodiments herein compile images captured by various printers 101 into a composite image and further into an augmented image which may be suitable for mark variability analysis.

With the term augmented used herein, it is referred to that variations are augmented or magnified compared to in the composite image. In order words, the variations in the augmented image are of a higher resolution that the variations in the composite image.

The embodiments herein are not limited to the above described embodiments. Various alternatives, modifications and equivalents may be used. Therefore, the above embodiments should not be taken as limiting the scope of the embodiments, which is defined by the appended claims. A feature from one embodiment may be combined with one or more features of any other embodiment.

The term "at least one of A and B" should be understood to mean "only A, only B, or both A and B", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A computer-implemented method performed by a computer comprised system for handling variations in a mark printed by a group of industrial printers, wherein the system is adapted to be connected to the group of industrial printers, the method comprising:
    obtaining images of the printed mark printed by each of the printers in the group;
    creating a composite image from the obtained images, wherein the printed marks appear as a repeating pattern in the composite image;
    comparing the printed marks in the composite image to each other or to another mark;
    detecting variations with a first resolution in the printed marks in the composite image as a result of the comparison;
    creating an augmented image in which the detected variations between the marks are magnified; and
    displaying the augmented image on a user interface.

2. The method according to claim 1, further comprising:
    obtaining an identification of a first industrial printer; and
    identifying at least one second industrial printer currently printing the same mark as the first industrial printer;
    wherein the first industrial printer and the second industrial printer are comprised in the printer group.

3. The method according to claim 2, wherein the identification of the first industrial printer is obtained from an operator, from the system, from another system or from a user interface.

4. The method according to claim 1, further comprising determining which printed mark the images should be obtained of, and wherein the group comprises printers printing the determined mark.

5. The method according to claim 1, further comprising measuring color and/or spatial variation in the detected variations.

6. The method according to claim 1, further comprising determining, based on a printer identification, ID, which printer in the group that has printed the mark in which the variations are detected, wherein each obtained image has a printer ID associated with the printer which printed the mark.

7. The method according to claim 1, further comprising initiating a change of printer settings and gathering of sensor data based on the detected variations.

8. The method according to claim 1, wherein the other mark to which the printed mark is compared is one or more of:
- an original version of the printed mark,
- a worst-case version of the printed mark, or
- a mark printed by another group of industrial printers.

9. A computer comprised system comprising a processor, the system is adapted to be connected to a group of industrial printers, wherein the system is adapted to, by means of the processor:
- obtain images of a mark printed by each industrial printer in a group of industrial printers;
- create a composite image from the obtained images, wherein the printed marks appear as a repeating pattern in the composite image;
- compare the printed marks in the composite image to each other or to another mark;
- detect variations with a first resolution in the printed marks in the composite image as a result of the comparison;
- create an augmented image in which the detected variations between the marks are magnified; and to
- display the augmented image on a user interface.

10. The system according to claim 9, being further adapted to:
- obtain an identification of a first industrial printer; and to
- identify at least one second industrial printer currently printing the same mark as the first industrial printer;
- wherein the first industrial printer and the second industrial printer are comprised in the printer group.

11. The system according to claim 10, wherein the identification of the first industrial printer is obtained from an operator, from the system, from another system or from a user interface.

12. The system according to claim 9, being further adapted to determine which printed mark the images should be obtained of, and wherein the group comprises printers printing the determined mark.

13. The system according to claim 9, being further adapted to measure color and/or spatial variation in the detected variations.

14. The system according to claim 9, being further adapted to determine, based on a printer identification, ID, which printer in the group that has printed the mark in which the variations are detected, wherein each obtained image has a printer ID associated with the printer which printed the mark.

15. The system according to claim 9, being further adapted to initiate a change of printer settings and gathering of sensor data based on the detected variations.

16. The system according to claim 9, wherein the other mark to which the printed mark is compared is one or more of:
- an original version of the printed mark,
- a worst-case version of the printed mark, or
- a mark printed by another group of industrial printers.

17. A non-transitory computer readable storage medium storing a computer program comprising instructions which, when executed on at least one processor, cause the at least one processor to carry out the method according to claim 1.

* * * * *